United States Patent Office 2,891,458
Patented June 23, 1959

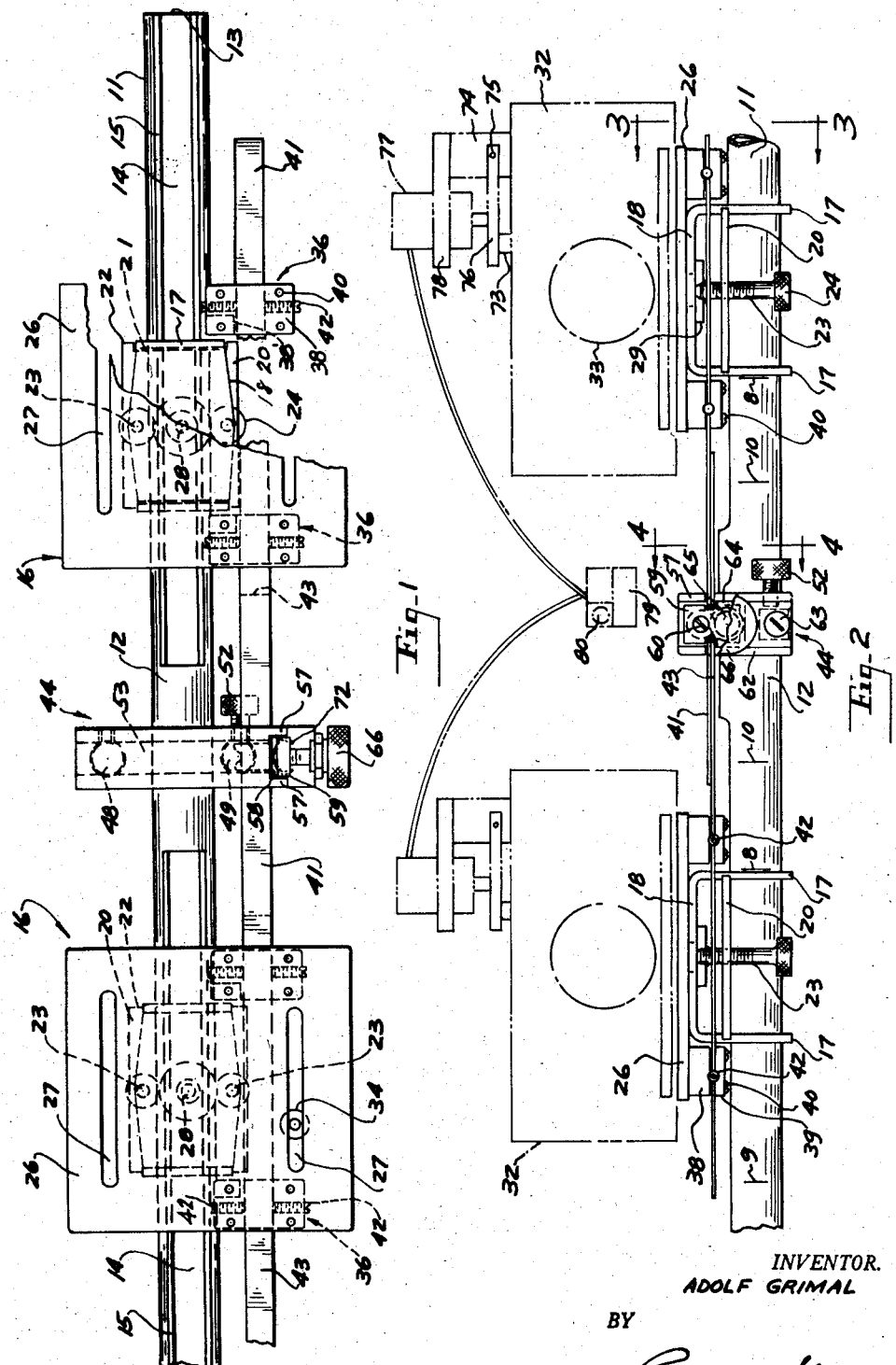
June 23, 1959 — A. GRIMAL — 2,891,458
STEREO CAMERA TANDEM MOUNT
Filed Dec. 11, 1957 — 2 Sheets-Sheet 1
INVENTOR.
ADOLF GRIMAL
BY
ATTORNEY June 23, 1959            A. GRIMAL            2,891,458
STEREO CAMERA TANDEM MOUNT
Filed Dec. 11, 1957            2 Sheets-Sheet 2
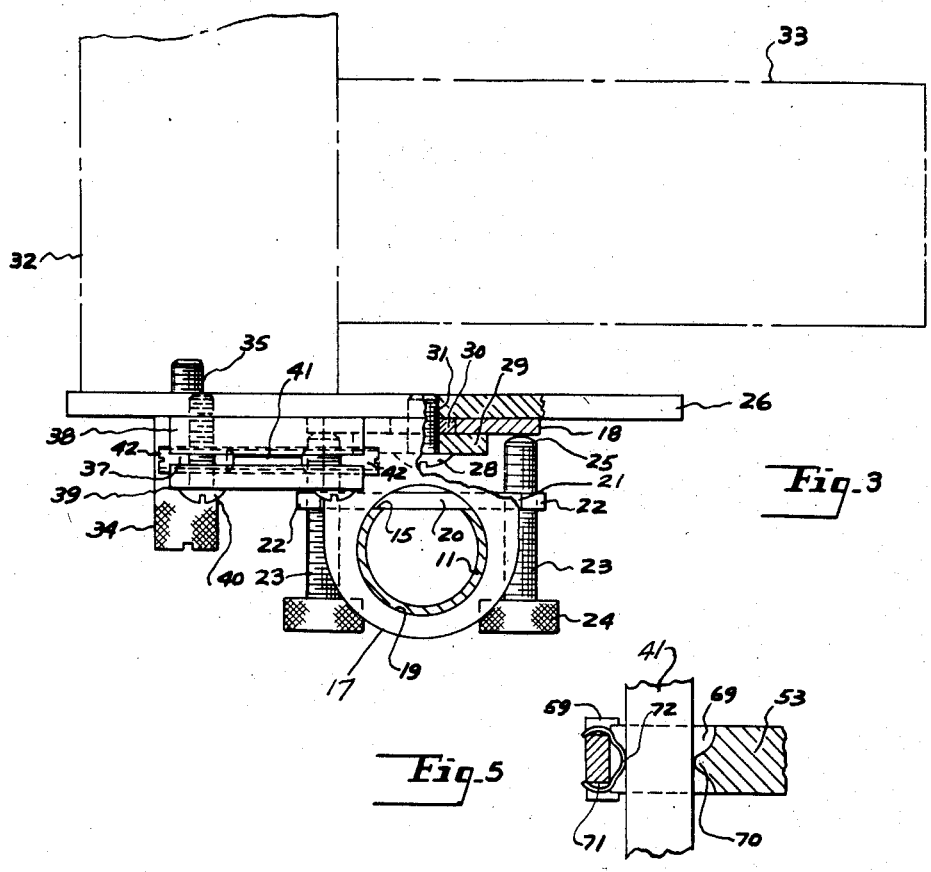
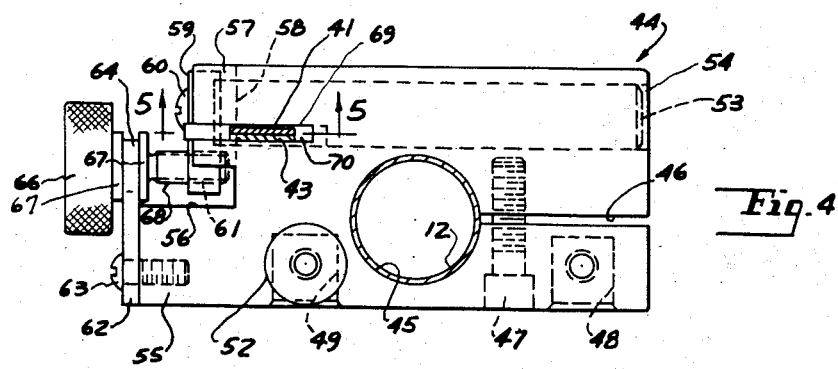
INVENTOR.
ADOLF GRIMAL
BY
ATTORNEY

2,891,458

STEREO CAMERA TANDEM MOUNT

Adolf Grimal, Walled Lake, Mich.

Application December 11, 1957, Serial No. 702,013

12 Claims. (Cl. 95—86)

This invention relates to a tandem mounting for two reflex single frame cameras using telephoto changeable lens to obtain telephoto stereoscopic film slides.

It is the object of the present invention to provide a novel tandem mounting for two reflex single frame cameras with telephoto lens thus forming a stereo combination adapted for positioning upon a conventional tripod or other support whereby the individual cameras may be slidably adjusted towards and away from each other, and angularly with respect to each other in vertical and horizontal planes.

It is the further object of the present invention to provide a single control member which interconnects the mountings for a pair of reflex single frame cameras whereby the angularity therebetween may be simultaneously adjusted in a horizontal plane.

These and other objects will be seen from the following specification and claims in conjunction with the appended drawing in which:

Fig. 1 is a fragmentary plan view of the present tandem mounting for a pair of cameras.

Fig. 2 is a front elevational view thereof.

Fig. 3 is a section taken on line 3—3 of Fig. 2.

Fig. 4 is a section taken on line 4—4 of Fig. 2.

Fig. 5 is a fragmentary section taken on line 5—5 of Fig. 4.

Fig. 6 is a side elevational view of the tripod adaptor for the mounting of the tandem camera mount.

It will be understood that the above drawings illustrate merely a preferred embodiment of the invention and that other embodiments are contemplated within the scope of the claims.

Referring to the drawings, the present tandem mount for a camera consists of an elongated tube 11 having a central circular portion 12, end portions 13 and the opposed top cut-away portions indicated by the slots 14 on opposite sides of central member 12 defining in said tube the spaced pairs of supporting ledges 15 which extend from the central portion 12 to the outer ends 13.

A pair of camera supporting assemblies 16 are adjustably provisioned upon opposite end portions of tube 11, one of which is described in detail.

The assembly 16 consists of a pair of upright bracket elements 17 with an interconnecting top 18, said bracket elements being transversely apertured at 19 for slidably positioning over tube 11 as shown in Figs. 2 and 3.

The substantially rectangular securing plate 20 is arranged within the bracket 17—18 and rests upon the top edges 15 of tube 11. The opposite ends of plate 20 are notched transversely as at 21 defining the retainers 22 at the corners of plate 20 which extend retainingly around opposing ends of bracket elements 17.

A pair of upright threaded studs 23 with knurled heads 24 project threadedly through central portions of plate 20 upon opposite sides of tube 11 and at their ends as at 25 operatively engage the undersurface of top plate 18 for tightly securing the bracket elements 17 in the desired longitudinally adjusted position upon tube 11.

For example, the two brackets as shown in the drawing are positioned at markings 8 for a 4 to 6 inch lens and for closeups for 9 to 16 inch lenses.

In Fig. 2, there are indicated a pair of markings 10 which would indicate longitudinal positioning of the brackets 17—18 for a 1 to 3 inch lens and for closeups for a 6-inch lens.

Additional markings 9 are also provided upon tube 11 indicating the location of the brackets for a 9 to 15 inch lens when photographing objects at a distance of approximately 100 feet or more.

Mounted upon the top 18 of the bracket assembly 17—18 is the horizontally disposed swivel plate 26 with a pair of transversely spaced elongated slots 27 one of which is adapted to receive the fasteners 34—35 from the undersurface thereof for securing up into and in retaining engagement with the camera 32 shown in phantom lines which for example may be 35 mm. reflex camera with a telephoto lens 33 or with a suitable reflex lens.

These cameras are respectively mounted upon each of the swivel plates 26 and secured thereon with lens approximately central to swivel axis for simultaneous photographing of objects for the production of stereoscopic film slides.

The swivel mounting of plate 26 upon the bracket top 18 is accomplished by a swivel screw 28 which extends up through washer 29 and through the spacer and pivot washer 30 nested within the top 18, and threadedly engages plate 26 as at 31. Washer 30 is slightly oversize in height with respect to plate 18 whereby an effective swivel assembly of plate 26 is provided.

The other of the slots 27 shown in Fig. 1 may be employed as a lens mounting, if desired.

Upon the undersurface of swivel plate 26, towards the forward side thereof I provide a pair of longitudinally spaced blocks 36 which are longitudinally slit at 37, Fig. 3, defining top plate 38 and the spaced bottom plate 39.

A series of fasteners 40 project up through both plates and threadedly engage camera mounting plate 26 for immovably securing said blocks thereto.

Referring to Fig. 1, a portion of the block 36 is unslit at the rear corner thereof as indicated at 38' so that the two plates 38—39 are flexibly joined together and are adapted to receive therebetween the longitudinally extending control arm 41 for the righthand assembly 16 and the control arm 43 for the lefthand assembly 16.

Opposed set screws 42 threadedly engage portions of plates 38 and 39 and operatively project against opposite sides of arm 41 at right angles to its longitudinal axis for adjustably and slidably securing said arm within the said blocks 36, as best illustrated in Figs. 1 and 3.

One purpose of the present invention is to effect horizontal simultaneous swinging movements of the inner ends of the control arms 41, 43 through the mechanism of the control housing 44, Fig. 4, which will effect simultaneous angular adjustments of the swivel plates 26 towards and away from each other for the correct parallax (or toe-in) setting of the respective camera lens on object.

The housing 44 has intermediate its ends the transverse circular aperture 45 by which the housing is slid over the central portion 12 of the tubular support 11 to take the central position between the camera mounting assemblies shown in Fig. 1.

The rear portion of housing 44 is horizontally slit at 46 and by means of the screw 47 is fixedly secured in the central position shown upon its support 11 and 12.

Upon the undersurface of housing 44 are a pair of longitudinally spaced sockets 48, 49 adapted to selectively receive the adaptor 50 which forms a part of a standard tripod head 51. The adaptor is secured within either of said sockets by the set screw 52, as illustrated in Figs. 2 and 4. The forward socket 48 would be used as the mounting socket where a larger camera lens is employed for securing a better balance.

The longitudinal bore 54 extends through the upper portion of housing 44 at right angles to base 11 and is adapted to slidably receive the elongated piston 53 which is joined to overlapping portions of the control arms 41 and 43 within the undercut slot 69 formed in said piston.

Housing 44 has a rearward extension 55, best illustrated in Fig. 4, and arranged above its top surface 56 are the rearwardly extending spaced end walls 57 or extensions defined by the upright slot 58 adapted to receive therebetween the upright control bar 59 which is secured by screw 60 to one end of piston 53.

The lower end of bar 59 is threaded as at 61 to receive the threaded shank 68 of the manually rotative control element or screw 66.

Plate 62 is secured at 63 to the rear end of extension 55 and extends thereabove. The upper end of plate 62 is bifurcated at 64 to cooperatively receive a portion 65 of Fig. 2, of the shank 68 bounded by the enlarged shoulders 67.

This assembly permits manual rotation of the handscrew 66. However, the plate 62 restrains said screw against endwise movement. Accordingly rotary movement of screw 66 will effect in and out movements of bar 59 and corresponding movements of piston 53.

Referring particularly to Figs. 4 and 5, the rear portion of piston 53 has an undercut slot 69 and at the end of said slot there is a forwardly extending fulcrum 70 against which bears portions of the two overlapped control arms 41 and 43. The upright bar 59 has a reduced portion 71 towards its upper end around which is positioned and secured flat pressure spring 72 in opposed registry with the fulcrum 70 to yieldingly engage edge portions of the control arms 41—43 for maintaining them in engagement with fulcrum 70.

Accordingly it becomes apparent upon manual rotation of handscrew 66 and corresponding in or out adjustments of piston 53 that there will be effected corresponding and simultaneous pivotal movements to the two control arms 41—43. This in turn through their fixed connection with swivel plates 26 effects corresponding inward or outward angular adjustments of said camera mounting plates for the setting of the same.

As above described the brackets 17—18 may be longitudinally adjusted upon the support 11 depending upon the position of the object to be photographed and the sizes of the lens involved. The said brackets 17—18 may be also arcuately adjusted in a vertical plane and additionally secured in position by the securing screws 24, as shown in Fig. 3.

The control assembly 44 at the central portion of base 11 provides additional means for effecting angular adjustment of the camera mounting plates 26 in a horizontal plane.

When the cameras are properly adjusted so that the object received through the lens viewer of both cameras are centered the respective films therein are simultaneously exposed through the operation of a conventional solenoid operated trigger and shutter control.

For illustration, each of the cameras has a shutter control button 73. The upright support 74 shown in dotted lines upon the camera 32 has pivoted thereto at 75 the trigger arm 76 which is adapted to operatively engage the shutter control 73. A conventional 6-volt solenoid 77 is mounted upon the overhanging bracket 78, and its movable element is joined to trigger 76 intermediate its ends.

Any conventional assembly may be employed intermediate the two cameras such as will include a 6-volt dry cell 79, for illustration, and a control switch 80 by which the respective solenoids for the two cameras may be activated simultaneously.

Having described my invention, reference should now be had to the following claims.

I claim:

1. A stereo camera tandem mount comprising an elongated base adapted for mounting upon a tripod or other support, a pair of brackets mounted and secured on said base in longitudinally adjustable spaced relation, a horizontally disposed camera mounting plate swivelly mounted on each bracket adapted for rotary adjustments in a horizontal plane, a control housing transversely mounted on said base intermediate said plates, a reciprocal means slidably positioned within said housing for movements at right angles to the longitudinal axis of said base, a pair of horizontally disposed control arms parallel to the longitudinal axis of said base adjustably secured at their respective outer ends to portions of said plates respectively, the inner ends of said arms being arranged in overlapped engaging relation and flexibly secured to said reciprocal means, and a manually rotative control element mounted on said control housing connected to said reciprocal means for effecting longitudinal adjustments thereof controlling simultaneous pivotal movements of said plates upon said brackets.

2. The camera mount of claim 1, said base consisting of a tube with a central circular portion receiving said control housing, and clamping means on said housing retainingly engaging said base.

3. In said camera mount of claim 1, said base consisting of a tube, the tops of outer portions of said tube being cutaway providing parallel spaced mounting edges, the securing of each of said brackets consisting of a locking plate bridging said edges, and a pair of handscrews threaded up through said plate on opposite sides of said tube with their ends operatively engaging said brackets.

4. In the camera mount of claim 1, said base consisting of a tube, the tops of outer portions of said tube being cutaway providing parallel spaced mounting edges, each bracket having a horizontal top wall and a pair of spaced transversely apertured ends depending therefrom receiving portions of said tube, the securing of each of said brackets consisting of a locking plate nested within each bracket bridging said mounting edges, and a pair of handscrews threaded up through said plate on opposite sides of said tube with their ends operatively engaging under-surface portions of the top walls of said brackets.

5. In the camera mount of claim 1, each bracket including a horizontal top wall spaced above said base, each camera mounting plate being centrally positioned upon a bracket top wall, and a swivel screw extending up through said bracket top wall and into said plate.

6. In the camera mount of claim 1, a horizontally slotted control block upon the undersurface of each camera mounting plate, the outer ends of said control arms projecting through the slots in said blocks respectively, and set screws extending into said blocks normally of said arms and operatively engaging the opposite edges thereof.

7. In the camera mount of claim 1, a horizontally slit control block upon the undersurface of each camera mounting plate, a portion of each block being unslit defining in said block a pair of superimposed flexibly connected plates, the outer ends of said control arms projecting between said plates respectively, opposed set screws extending between and threadedly engaging said plates normally of said arms and operatively engaging the opposite edges thereof, and a series of screws extending up through said plates and into said camera mounting plate drawing said control plates together to tightly lock said set screws respectively.

8. In the camera mount of claim 1, a pair of horizontally slotted spaced control blocks upon the undersurface of each camera mounting plate, the outer ends of said control arms proejcting through the slots in said blocks respectively, and set screws extending into said blocks normally of said arms operatively engaging opposite edges thereof.

9. In the camera mount of claim 1, the reciprocal means in said control housing consisting of an elongated piston having an undercut slot at one end cooperatively receiving said control arms, an upright plate secured to and depending from one end of said piston, and spring means on said plate retainingly engaging said control arms.

10. In the camera mount of claim 1, the reciprocal means in said control housing consisting of an elongated piston having an undercut slot at one end cooperatively receiving said control arms, an upright plate secured to and depending from one end of said piston, and spring means on said plate retainingly engaging said control arms, said piston adjacent its undercut slot in opposed spaced relation to said spring means having an anvil engaging said control arms providing a fulcrum point.

11. In the camera mount of claim 1, the reciprocal means in said control housing consisting of an elongated piston having an undercut slot at one end cooperatively receiving said control arms, an upright plate secured to and depending from one end of said piston, supportably retaining said control arms within the slotted portion of said piston, said manually rotative control element threadedly engaging said upright plate.

12. In the camera mount of claim 1, the reciprocal means in said control housing consisting of an elongated piston having an undercut slot at one end cooperatively receiving said control arms, an upright plate secured to and depending from one end of said piston supportably retaining said control arms within the slotted portion of said piston, said manual rotative control element threadedly engaging said upright plate, and means on said control housing retainingly engaging said manual rotative control element limiting movements thereof to rotary movements.

References Cited in the file of this patent

UNITED STATES PATENTS

| | | |
|---|---|---|
| 2,211,714 | Buckham | Aug. 13, 1940 |
| 2,545,465 | Hough | Mar. 20, 1951 |